United States Patent [19]

Bock et al.

[11] 4,078,811

[45] Mar. 14, 1978

[54] SEALING DEVICE FOR CONTAMINATED AND/OR ACTIVATED STRUCTURAL ELEMENTS

[75] Inventors: Alexander Bock; Hans-Georg Tabbert, both of Gummersbach, Germany

[73] Assignee: L. & C. Steinmuller G.m.b.H., Gummersbach, Germany

[21] Appl. No.: 728,834

[22] Filed: Oct. 1, 1976

[30] Foreign Application Priority Data

Oct. 3, 1975 Germany .............................. 2544187

[51] Int. Cl.$^2$ .............................................. F16J 15/06

[52] U.S. Cl. ...................................... 277/107; 277/16

[58] Field of Search .................. 277/113, 114, 115, 2, 277/16, 107

[56] References Cited

U.S. PATENT DOCUMENTS

| | | | |
|---|---|---|---|
| 2,604,225 | 7/1952 | Armstrong | 277/107 |
| 3,749,411 | 7/1971 | Lennon et al. | 277/2 |

*Primary Examiner*—Robert I. Smith

*Attorney, Agent, or Firm*—Walter Becker

[57] ABSTRACT

A sealing device for inner surfaces of hollow bodies such as pipes, containers, or the like which have adhering thereto contaminated or activated material. The sealing device comprises two supporting plates arranged in spaced relationship and substantially parallel to each other while extending in a direction perpendicular to the axis of the hollow body to be sealed. Of these two plates, the outer one is provided with a filling connection and with a discharging connection. The two supporting plates are adapted by means of pull elements to be tightened against a yieldable seal which is positively guided and is arranged along the circumferential rim of the hollow body.

2 Claims, 2 Drawing Figures

SEALING DEVICE FOR CONTAMINATED AND/OR ACTIVATED STRUCTURAL ELEMENTS

The present invention relates to a sealing device or arrangement for inner surfaces, predominantly of hollow bodies, such as pipes, containers, or the like, which are covered by or have adhering thereto contaminated and/or activated media.

Hitherto, it was known to weld on cover plates of solid material of uniform thicknesses for example in the area of the hollow bodies which are to be sealed. However, such an arrangement has the drawback that the assembly personnel were exposed to higher radiation when carrying out fitting, fastening, and welding operations. Furthermore it was disadvantageous, in difficult to reach places, to attach the mostly heavy covers quickly and safely to the hollow bodies. During the welding onto contaminated and/or activated structural elements or components, with the known procedures the further danger exists that contaminated and/or activated materials regardless of the physical condition thereof will be emitted uncontrollably to the environment or the surrounding locality.

It is an object of the present invention to provide a device which, while avoiding the above mentioned drawbacks, will assure that contaminated and/or activated materials regardless of their physical condition in the hollow bodies to be sealed, are not uncontrollably emitted into the environment.

Figure 1:
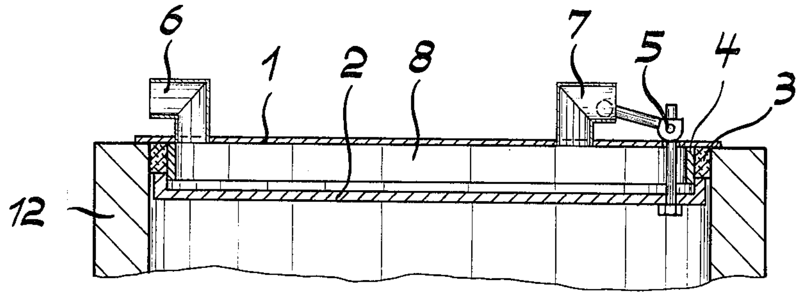

This object and other objects and advantages of the invention will appear more clearly from the following specification in connection with the accompanying drawing, in which:

FIG. 1 shows a sealing device or arrangement according to the invention without transporting hooks or lugs, for hollow bodies not having an external insulation.

Figure 2:
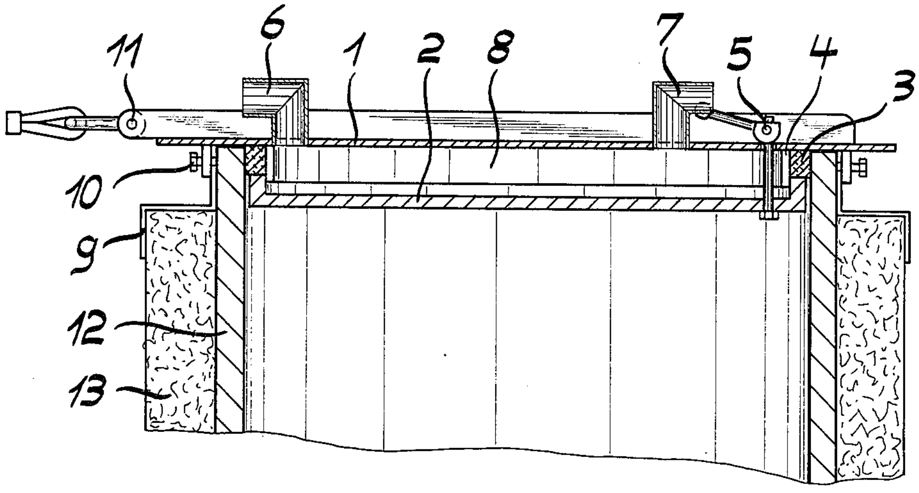

FIG. 2 shows a sealing device according to the present invention, with transporting hooks or lugs and sleeves for hollow bodies with external insulation means. The sealing device, according to the present invention, is characterized primarily in that the sealing device or arrangement comprises two support or carrier plates arranged perpendicular to the axis of the hollow body to be sealed and in parallel spaced relationship to each other. The outer support or carrier plate is provided with a tubular inlet or filling connection and a tubular outlet connection. The support or carrier plates are adapted by tension elements to be tightened against a yieldable seal having a positive guiding means and being arranged along the peripheral rim of the hollow body to be sealed.

In order to better transport and more quickly assemble the sealing device or arrangement as well as to transport the hollow body, it is further proposed that transporting hooks or lugs be mounted on the outer support or carrier plate.

The primary advantage of the present invention consists in that the hollow bodies are quickly and securely sealable in the shortest possible time by means of structurally simple devices. This results in the further advantage of a shorter assembly time and thereby in a decreased radiation exposure to assembly personnel.

A further advantage is seen in the fact that the tolerances in the area of the hollow bodies may be securely bridged by means of the sealing devices or arrangements.

Referring now to the drawing in detail, the sealing device shown therein comprises an exterior support or carrier plate 1, an inner support or carrier plate 2, the seal 3 with positive guiding means 4, tension elements 5, the tubular filling connection 6, the tubular discharging connection 7, protecting or shielding material 8, sleeve 9 with adjustment 10, and transporting hooks or lugs 11.

The sealing device or arrangement according to the invention is placed on the hollow body 12 manually or with the aid of a material handling device. The hollow body 12 may be constructed as a container, pipe, or any opening section in containers, pipes, etc. The support or carrier plates 1 and 2 are pressed against each other by the tension elements 5. The seal 3, which is made of rubber or similar elastic material, is pressed between the support or carrier plates, 1 and 2 against the positive guiding means 4 and the inner walls of the hollow body. The pressing takes place until the hollow body is tightly sealed.

After the seal is achieved, the protecting or shielding material 8 is introduced through the filling or inlet connection 6 into the cavity formed by the support or carrier plates 1 and 2 on the one hand and by the positive guiding means 4 on the other hand. The cavity is exhausted through the outlet connection 7 by means of a vacuum, compression, etc.

Normally, however, the hollow bodies are provided with insulation 13 of various consistencies which must then be protected or covered. This covering is accomplished by a sleeve 9 which is fastened and held to the outer support or carrier plate 1 by adjusting means 10.

By means of transporting hooks or lugs 11 (FIG. 2), the sealing device or arrangement may without efforts be placed even on hard-to-reach places. Furthermore, by means of the transporting hooks or lugs 11, the hollow body may be transported along with the sealing device.

It is, of course, to be understood that the present invention is, by no means, limited to the specific showing of the drawing but also comprises any modifications within the scope of the appended claims.

What we claim is:

1. A device for sealing hollow bodies having rims, especially pipes and containers, the inner surfaces of which have adhering thereto contaminated and activated material from which decreased radiation exposure to personnel is encountered by attaining shorter assembly and disassembly time, which comprises in combination: outer and inner support plates both mounted perpendicular to the axis of and upon the hollow body to be sealed and arranged in parallel spaced relationship to each other so as to form a space between both said support plates; inlet means associated with said outer plate for introduction of protective shielding material through an inlet into said space laterally between both said support plates, outlet means associated with said outer plate to allow evacuation of said space between said support plates, a yieldable seal located between said support plates and said hollow body, positive guiding means associated with said seal and located along the rim of said hollow body, and tightening elements associated with said support plates for quickly tightening the same against said seal.

2. A sealing device in combination according to claim 1, which includes transporting means mounted onto said outer support plate.

* * * * *